United States Patent
Ford

[15] 3,677,213
[45] July 18, 1972

[54] SKIRTED AIR CUSHIONED PLANING HULL

[72] Inventor: Allen G. Ford, 6816 Old Stage Road, Rockville, Md. 20852

[22] Filed: Sept. 17, 1970

[21] Appl. No.: 72,960

[52] U.S. Cl. .........................................................114/67 A
[51] Int. Cl............................................................B63b 1/38
[58] Field of Search ..................................................114/67 A

[56] References Cited

UNITED STATES PATENTS 3,476,069  11/1969  Mantle et al..........................114/67 A
3,481,297  12/1969  Mantle.................................114/67 A Primary Examiner—Andrew H. Farrell
Attorney—R. S. Sciascia, Q. E. Hodges and A. B. Croft

[57] ABSTRACT

A modified planing hull vessel containing flexible stable seals completely surrounding the periphery of the hull except at the stern section where the hull itself acts as its own seal by being in close proximity with the water. The vessel rests on both an air cushion confined within the area formed by the flexible seals and on a small wetted section of the bottom of the hull.

1 Claim, 7 Drawing Figures

Patented July 18, 1972 3,677,213

INVENTOR.
ALLEN G. FORD
BY Alan B. Croft
AGENT
Hodges
ATTORNEY

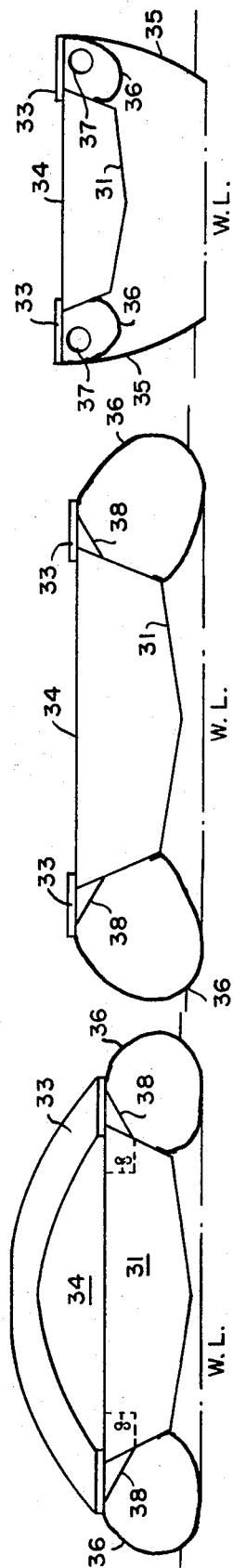
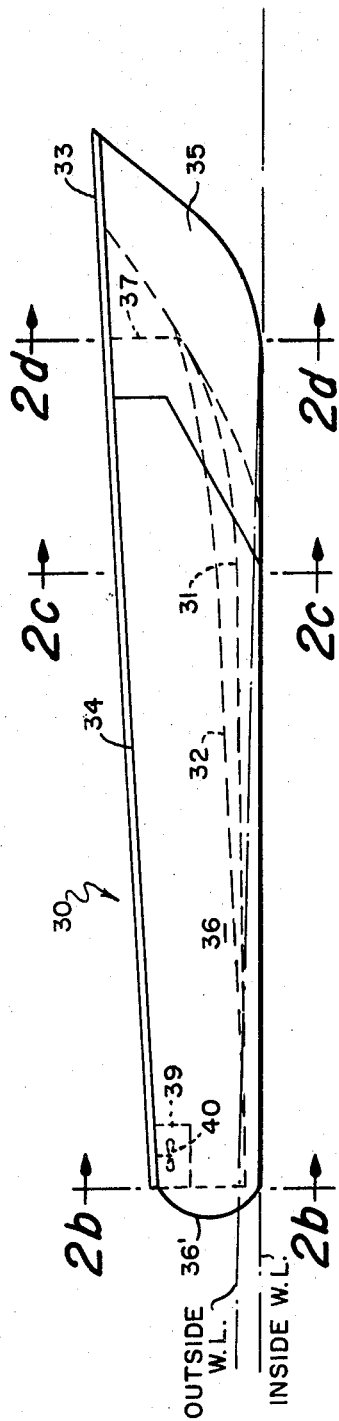
INVENTOR.
ALLEN G. FORD

SKIRTED AIR CUSHIONED PLANING HULL

The invention described herein may be manufactured and used by or for the Government of the United States of America for governmental purposes without the payment of any royalties thereon or therefor.

BACKGROUND OF THE INVENTION

There are two craft which have in the past attempted to carry out the same goal as the instant invention; that being to efficiently reduce the skin friction of a vessel. These are the fully skirted Air Cushion Vehicle (ACV) and the Sidewall ACV or Captured Air Bubble Vehicle (CAB). The skirted ACV concept utilizes a large cushion of air to completely separate the hull from the water, although some skirt contact does occur. The CAB also uses a cushion of air to separate the hull from the water but in this case, sidewalls are used to minimize leakage on the side, while still retaining essentially all the load on the cushion. These side walls extend downward from the sides of the hull and are immersed in the water. In addition to having sidewalls (skegs) the CAB provides fore and aft seals which aid in confining the air bubble to a region under the hull of the vessel.

The skirted ACV and CAB have certain inherent problems in relation to power requirements, stability and/or cost which have been improved upon by the instant invention. For example, because the skirted ACV normally uses air propellers as its source of power, this vehicle experiences great difficulty in achieving an adequately low thrust coefficient at hump and cruise speed due to limited desirable air propeller size.

An additional problem exists with the instability of both the skirted ACV and CAB in side slip. The CAB cannot take excessive side slip angles because the sidewall acts as a pivot for the craft to roll around. On the other hand the skirted ACV has little inherent resistance to side slip because of its lack of contact with the water surface.

The basic concept of providing an air cushion with a planing hull is old in the art as illustrated by Priest's hydrokeel (U.S. Pat. No. 3,027,860). The hydrokeel was aimed at reducing the skin friction by lubricating the hull with an air layer. This craft had immersed rigid sidewalls, such as the skegs found in the CAB. The air cushion planing hull described in this disclosure is a marked improvement over this type of hydrokeel craft.

SUMMARY OF THE INVENTION

The Air Cushion Planing Hull (ACPH) is basically a planing hull type craft but with flexible, stable seals around its periphery except at the stern section of the hull where the craft itself contacts the water and acts as its own seal. Within the confines of the seals is an air cushion which partially supports the hull. The reduction in wetted area due to the air cushion which the ACPH experiences over conventional planing hulls causes a reduction in hydrodynamic drag and thus a reduction in the power required to propel the craft. Although the power required for supplying the air cushion should, to some extent, offset this reduction in drag, the net power change, under most conditions, results in a substantial reduction in power requirements or in effective total drag. In addition the ACPH contains a wetted area where the hull contacts the water and so can use water propulsion means and conventional control means. Consequently, the problems with air propellers and stability existing in skirted ACV and CAB as discussed hereinbefore are greatly reduced in the instant invention. Also the simplicity and lower cost of the ACPH makes it desirable for roles where the fully skirted ACV is expensive or where it is desirable to convert an existing planing hull with modest modifications to an ACPH. A further point of importance is that by causing the planing hull to accept part of the load, the ACPH acquires stability and maneuverability from the planing hull. In this manner the ACPH incorporates the best attributes of both the planing hull and the ACV.

The ACPH has many advantages over the planing hull, one of which is its resistance to porpoising which is particularly noticeable with planing hulls in calm water.

A second advantage concerns the planing hull's tendency to develop negative pressure (suction) under the aft central portion of the hull, thereby increasing vehicle drag. This is detrimental and contrary to the basic aim of the craft, that being to provide support. The ACPH overcomes this suction problem by having the bow ride higher and thus increasing the angle of attack (or trim) of the local planing surface in the aft central region.

Whether because of the previously mentioned suction effect, or for other reasons, the transhump drag of a planing hull can be high. A third advantage of the ACPH is its ability to transit the hump speed region at reduced drag and therefore rise above this problem.

Finally, relative to sidewall craft such as the CAB or the hydrokeel, the air cushion planing hull can beach in an advantageous way. Its beaching performance is also significantly superior to that of the basic planing hull. The following is an example of one beaching method. The propulsion means is an inboard-outboard propeller and housing that (as is conventionally the case) swivels up without propeller damage as a shallow beach is approached. The ACPH drops a rear anchor a short distance off shore and then runs in to the beach with some forward speed and with the fan power on the skirt active. Momentum carries it forward until the rear of the ACPH beaches. The cushion power then shuts down and the craft is securely beached with a dry (on the beach) bow section for any reasonable beach slope. Waves will not wash the craft from the beach nor broach it. To pull back from the beach the cushion power (fan) is activated to lift the craft from the beach as much as possible. Then winching-in the aft anchor and/or reverse propeller power is initiated to pull the craft from the beach.

Further, in approaching a beach in severe surf conditions, the ACPH is considerably superior to a planing hull, a CAB or a hydrokeel relative to the danger of broaching. The reason for this is the fact that the forward end on the craft is on a cushion of air and is therefore relatively frictionless to cross flows. Therefore cross flows forward could not grab the bow and cause craft broaching.

In relation to intended use the ACPH can compete with the planing hull in such various missions as reverine warfare, swimmer deployment and recovery, amphibious assault, etc. The ACPH additionally has the advantages of higher speed, reduced transhump drag and power requirements and habitability or seaworthiness. Finally, the water propulsion system of the ACPH leads to a lower radiated noise level in air and lower cost of the skirted ACV.

Accordingly, the present invention proposes to overcome most of the inherent difficulties of the prior art and is directed to a novel means of reducing hydrodynamic resistance of a water-borne vehicle.

It is a further object of this invention to provide an air cushion beneath an existing planing hull so that the resultant vehicle has less wetted area and therefore less drag.

Furthermore, it is an object of this invention to provide unique seal arrangements for containing an air cushion beneath a portion of a water-immersed vehicle.

Other objects and many of the attendant advantages of this invention will be readily appreciated as the same becomes better understood by reference to the following detailed description when considered in connection with the accompanying drawings wherein:

BRIEF DESCRIPTION OF THE DRAWINGS

FIG. 1b shows a front view of the ACPH depicted in FIG. 1a;

FIG. 1c shows a bottom view of the ACPH depicted in FIG. 1a;

FIG. 2a illustrates in schematic form a side view of an ACPH vehicle which has an alternative form of seal arrangement;

FIG. 2b shows a cross-section of the ACPH depicted in FIG. 2a cut along the 2b–2b line;

FIG. 2c shows a cross-section of the ACPH depicted in FIG. 2a cut along the 2c–2c line; and FIG. 2d shows a cross-section of the ACPH depicted in FIG. 2a cut along the 2d–2d line.

DESCRIPTION OF THE PREFERRED EMBODIMENT

Figure 1B:
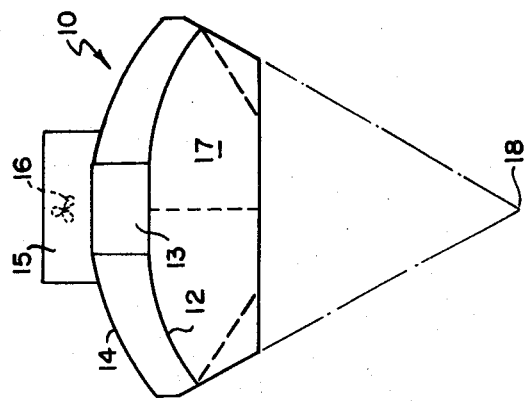
Figure 1A:
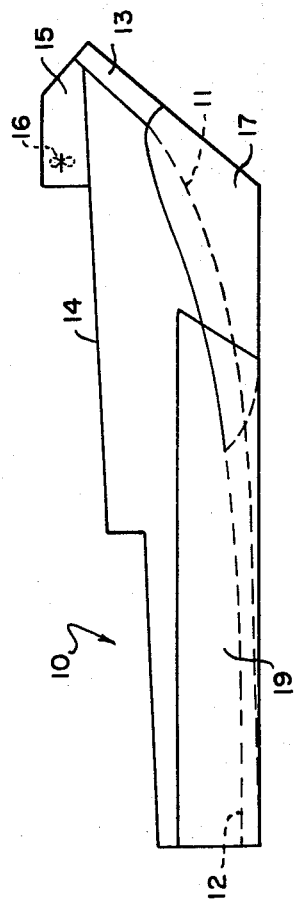
FIG. 1a illustrates in schematic form a side view of an ACPH vehicle which has a seal arrangement which closely follows the contours of the hull.
Figure 1C:
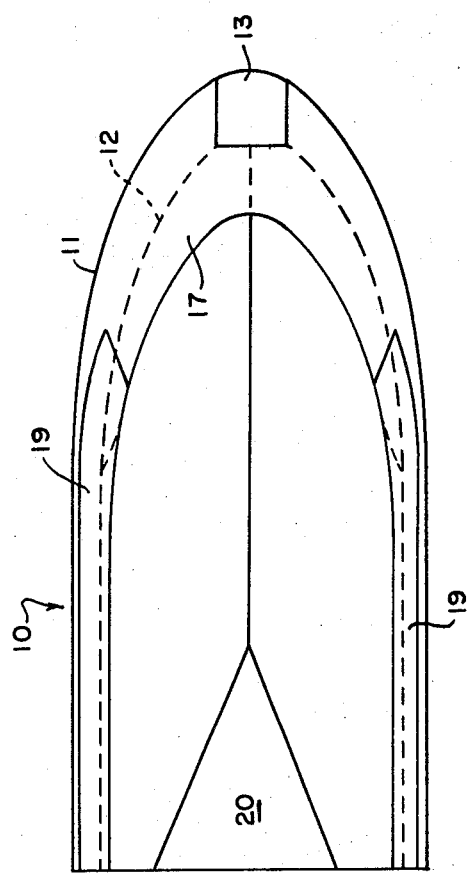

Referring to FIGS. 1a, 1b and 1c an air cushioned planing hull vehicle (ACPH) 10 is shown in schematic form containing a planing hull 11, a deck 14 and a chine line 12. A tubular duct 13 opened at both ends is fastened to the upper part of the bow of said vehicle and extends outward from said bow and downward from said deck to a point adjacent the beginning of said chine line. Said duct is connected at its upper end to a hollow blower housing 15 which is fastened to both the deck of said vehicle and said duct in such a manner that fluid can pass freely between the two. A fan 16 is positioned within housing 15 for forcing air into said duct 13.

A fore seal 17 made of a single layer fabric-like flexible material is fastened to said vehicle and completely surrounds a portion of said bow. Said fore seal is conical in shape having a vertex at a distant point 18 as shown in FIG. 1b. Said fore seal is attached to the front of said vehicle at the lower end of said duct 13 and extends to a rearward point following the contour of said chine line. Said fore seal may be fastened to said vehicle by any conventional means. When air is forced into duct 13 it passes into the area formed by fore seal 17, the fore section of hull 11 and the water surface thereby causing said fore seal to expand. When the forced air is under great enough pressure the bow of said vessel will rise out of the water and be supported by a cushion of air. In order to confine this cushion of air or air bubble, two flexible side seals 19 are provided. Said side seals are quadrangular in shape and are fastened to the sides of said hull above said chine line. Said side seals extend from the stern of said vehicle to a point forward of the ends of said fore seal and overlap the ends of said fore seal.

There are two basic rules which must be taken into consideration in designing an ideally stable, flexible fore seal capable of containing an air cushion. These are as follows: (1) the skirt design when spread out must lie in a planar surface. For example, when a cylinder is unrolled it assumes the form of a rectangle in a two-dimensional plane. Therefore, to obtain maximum flexibility the above-requirement is desirable, but in most practical cases the irregular shape of the vehicle dictates the need for a certain amount of tailoring. Accordingly, tailoring means seams and seams create semirigid points or limits which in turn limit flexibility; (2) the skirt design, when fabricated, must be some function of a circle, such as a cone or a cylinder. This is desirable since such a design will tend to remain a stable shape. Therefore, while under pressure, said seal will spring back to its original shape when deformed and will support a load either along its axis or along its radius if it is properly supported.

The fore seal shown in FIG. 1a is conical in shape, more precisely a section of a truncated canted cone. Said fore seal has a reluctance to flap outward and has a tendency to spring back to shape when deformed. In addition, it is important that the side seals retain their shape and therefore, when required, may be provided with flexible stays such as nylon rods, which add to their stiffness but at the same time do not appreciably detract from their flexibility. Accordingly, the side seals resist bubble pressure but yet respond to water forces while preventing air escape along the sides of the hull.

Therefore, fore seal 17 and side seals 19 work in combination to form a flexible stable skirt which completely surrounds the sides and bow of the planing hull and enables said hull to partially rest on a cushion of air. Since it is desirable to retain some of the basic characteristics of the planing hull, a wetted area 20 is provided where the bottom of the hull penetrates the water as is shown in FIG. 1c. This wetted area increases and decreases according to the pressure of the air bubble and other conditions, and in this way provides heave, pitch and roll stability for the entire vehicle. This then reduces the stability problems generally encountered with other flexible skirt systems. In addition, since the hull enters the water at the wetted area, conventional water propulsion and control means may be employed.

Accordingly, a modified planing hull vehicle is provided which partially rests on a cushion of air so that said vehicle has less wetted area and therefore less drag. However the planing hull's basic design is retained so as to contribute to the stability and control of the craft; provide a base for mounting such things as water propulsion means, cargo, crew and passengers; etc. In addition other beneficial effects such as lowered trans-hump-speed drag with partial cushion support and a smoother ride than that of the planing hull are obtained.

FIGS. 1a–c illustrate relatively uncomplicated means for providing a planing hull with partial air cushion support. But the area of the cushion in these figures is not much larger than the basic planing hull planform. If the planform were substantially greater, a lower wavemaking drag would result. Accordingly, FIGS. 2a–d shows an ACPH with a substantially increased planform.

Referring to FIGS. 2a–d, a second embodiment of an air cushioned planing hull vehicle is illustrated. In this case the air cushion support is provided over a much larger area than the basic hull planform area. A vehicle 30 is shown having a planing hull 31, a chine line 32 and a deck 34. A panel element 33 is mounted over the edge of the deck and extends completely around the two sides and bow of said vehicle. Said panel element could be made for example from an airmat (Goodyear-air-inflated panel structure) or rigid (e.g. wood) material. Said panel element is supported partially by being fastened to the deck and in addition by support members 38 spaced along the length of the hull. The air bubble is confined within a skirt arrangement comprising a flexible stable fore seal 35 and two flexible stable side seals 36. The side seals are tubular in shape with each having a closed end 36' and an open end 37 and said seals extending from the stern substantially along the entire length of each side of said vehicle. The shape of said side seals is best illustrated in FIGS. 2b, 2c and 2d where cross-sectional views show the changing shape of said seals from a first diameter at the closed end to a larger diameter in the middle and finally to a smaller diameter at the open end.

The side seals are fastened to both said panel element 33 and the sides of the hull thereby forming enclosed areas into which air is forced. The air is provided by fans 40 positioned in fan housings 39 located in the sides of the hull adjacent the stern. The air is forced at a great enough pressure to keep the side seals expanded, taking into consideration the fact that losses are occurring at the open ends 37. Overlapping the front portions of the side seals is flexible, stable fore seal 35. Said fore seal is similar in shape to the fore seal FIG. 1 and is fastened to the front portion of panel element 33. The shape of the fore seal prevents it from flapping in an outward direction and therefore provides an area for confining the air bubble. Consequently, the air forced through open ends 37 of the side seals travels into an area formed by the bow of said vehicle, the water surface and fore seal 35. Thusly, the fore and side seals work in combination to enable the vehicle to rest partially on a cushion of air. In addition part of the vehicle remains in the water so as to provide vehicle stability, a base for vehicle water propulsion means, etc.

The ACPH thus rides over the water surface with little water to hull friction surface contact thereby decreasing the thrust and power required to propel the vehicle. Furthermore, the power required to supply the air cushion between the bottom of the hull and the water surface is small and therefore the total power required in the ACPH is materially less than that used in the planing hull. Additionally, the invention, as disclosed, can either dispense with expensive design curves and streamlining, or can be easily and inexpensively installed on an existing planing hull.

Obviously many modifications and variations of the present invention are possible in the light of the above teachings. It is therefore to be understood that within the scope of the appended claims the invention may be practiced otherwise than as specifically described.

What is claimed is:

1. A surface effect vehicle which depends in operation on a region of super-atmospheric pressure on its underside for a portion of its support comprising:

a body plan form having an intended line of travel, said plan form including a bow, sidewalls, stern, and bottom having a substantial dead-rise; and a flexible stable skirt member attached to said plan form and extending along the bow and entire length of said sidewalls to effectively enclose said bow and sidewalls, said skirt being collapsable inwardly against the bottom having a dead-rise when the vehicle is in side hydrodynamic forces normal to the dead-rise surface to avoid the danger of unstable roll out.

* * * * *